US012596263B2

(12) United States Patent
Shi

(10) Patent No.: US 12,596,263 B2
(45) Date of Patent: Apr. 7, 2026

(54) OPTICAL MODULE AND ELECTRONIC DEVICE

(71) Applicant: GOERTEK OPTICAL TECHNOLOGY CO., LTD, Shandong (CN)

(72) Inventor: Chaiyuan Shi, Shandong (CN)

(73) Assignee: GOERTEK OPTICAL TECHNOLOGY CO., LTD, Shandong (CN)

( * ) Notice: Subject to any disclaimer, the term of this patent is extended or adjusted under 35 U.S.C. 154(b) by 393 days.

(21) Appl. No.: 18/247,131

(22) PCT Filed: Dec. 20, 2021

(86) PCT No.: PCT/CN2021/139714
§ 371 (c)(1),
(2) Date: Mar. 29, 2023

(87) PCT Pub. No.: WO2023/097806
PCT Pub. Date: Jun. 8, 2023

(65) Prior Publication Data
US 2024/0361608 A1 Oct. 31, 2024

(30) Foreign Application Priority Data

Nov. 30, 2021 (CN) .......................... 202111445324.2

(51) Int. Cl.
*G02B 27/10* (2006.01)
*G02B 27/01* (2006.01)
*G02B 27/12* (2006.01)

(52) U.S. Cl.
CPC ....... *G02B 27/106* (2013.01); *G02B 27/0172* (2013.01); *G02B 27/126* (2013.01)

(58) Field of Classification Search
CPC . G02B 27/106; G02B 27/0172; G02B 27/126
USPC ......................................................... 359/630
See application file for complete search history.

(56) References Cited

U.S. PATENT DOCUMENTS

2013/0215391 A1 8/2013 Wang
2016/0305761 A1 10/2016 Girshovitz et al.

FOREIGN PATENT DOCUMENTS

| CN | 101455077 A | 6/2009 |
|----|-------------|--------|
| CN | 105892064 A | 8/2016 |
| CN | 107562181 A | 1/2018 |
| CN | 108828774 A | 11/2018 |
| CN | 110286489 A | 9/2019 |

(Continued)

*Primary Examiner* — William Choi
(74) *Attorney, Agent, or Firm* — Ingrassia Fisher & Lorenz, LLP

(57) ABSTRACT

An optical module and an electronic device are disclosed. The optical module comprises a beam splitting assembly, a beam combining assembly, a first dimmer assembly and a second dimmer assembly. The beam splitting assembly is configured to divide the incident light into a first light beam and a second light beam that propagate in different directions. The first dimming assembly is located on the light path of the first light beam, and the second dimming assembly is located on the light path of the second light beam. The beam combining assembly is located at the intersection position, so that the first light beam and the second light beam entering the beam combining assembly exit concurrently along the same direction.

16 Claims, 2 Drawing Sheets

(56)    References Cited

FOREIGN PATENT DOCUMENTS

| CN | 112255809 A | | 1/2021 | |
| CN | 113075127 A | * | 7/2021 | ............. G01N 21/01 |

* cited by examiner

OPTICAL MODULE AND ELECTRONIC DEVICE

CROSS-REFERENCE TO RELATED APPLICATIONS

This Application is a U.S. National-Stage entry under 35 U.S.C. § 371 based on International Application No. PCT/CN2021/139714, filed Dec. 20, 2021 which was published under PCT Article 21(2) and which claims priority to Chinese Application No. 202111445324.2, filed Nov. 30, 2021, which are all hereby incorporated herein in their entirety by reference.

TECHNICAL FIELD

This application pertains to the field of optical technology, more specifically, to an optical module and an electronic device.

BACKGROUND

With the development of science and technology, more and more electronic devices are required to be thin and light. In some electronic devices with optical systems, the size of the display is required to be smaller and smaller, while the angle of view of the system is required to be larger and larger. However, the size of the display and the angle of view of the system are contradictory, namely, the smaller the size of the display, the smaller the angle of view of the system will become.

In order to solve the above problem, in the prior art, some lens assemblies having a function of amplification are usually added in front of the display to directly amplify the light emitted by the display, thereby increasing the angle of view of the system finally. However, the increase of the angle of view by this amplification method is limited, and it still cannot meet the need of some electronic devices having special requirements for the angle of view, such as AR (augmented reality) or VR (virtual reality). In addition, other objects, desirable features and characteristics will become apparent from the subsequent summary and detailed description, and the appended claims, taken in conjunction with the accompanying drawings and this background.

SUMMARY

The object of the present disclosure is to provide a new technical solution of an optical module and an electronic device.

According to a first aspect of the present disclosure, there is provided an optical module. The optical module comprises:

a beam splitting assembly configured to divide an incident light into a first light beam and a second light beam that propagate in different directions;

a first dimming assembly and a second dimming assembly, wherein the first dimming assembly is located on a light path of the first light beam, the second dimming assembly is located on a light path of the second light beam, the first dimming assembly and the second dimming assembly adjust propagation directions of the first light beam and the second light beam respectively so that the light path of the first light beam and the light path of the second light beam have an intersection position; and a beam combining assembly located at the intersection position so that the first light beam and the second light beam entering the beam combining assembly exit concurrently along a same direction.

Optionally, the beam splitting assembly is a glued prism formed by gluing four isosceles triangular prisms, the glued prism has a light incidence surface and two light exit surfaces, the incident light enters from the light incidence surface, and the first light beam and the second light beam exit from the two light exit surfaces respectively.

Optionally, an optical path length of the first light beam from the light incidence surface to the corresponding light exit surface is equal to an optical path length of the second light beam from the light incidence surface to the corresponding light exit surface.

Optionally, each isosceles triangular prisms is made of a glass material having a refractive index of 1.5 to 1.55.

Optionally, the first light beam and the second light beam obtained by dividing the incident light have opposite propagation directions;

the first dimming assembly comprises a first reflector and a second reflector, the first light beam changes its propagation direction by 180° after reflected by the first reflector and the second reflector successively, and then enters the beam combining assembly;

the second dimming assembly comprises a third reflector and a fourth reflector, the second light beam changes its propagation direction by 180° after reflected by the third reflector and the fourth reflector successively, and then enters the beam combining assembly concurrently with the first light beam.

Optionally, the optical module further comprises a shaping lens group located on the light path of the first light beam and/or the second light beam for transmitting the first light beam and/or the second light beam.

Optionally, the shaping lens group is made of a plastic material having a refractive index of 1.5 to 1.6.

Optionally, the beam combining assembly comprises a first flat lens, a second flat lens and a concave mirror;

the first light beam is reflected by the first flat lens, and then is reflected by the concave mirror, and then passes through the first flat lens, and finally exits from the beam combining assembly;

the second light beam is reflected by the second flat lens, and then is reflected by the concave mirror, and then passes through the first flat lens, and finally exits from the beam combining assembly along a same direction as the first light beam.

Optionally, the concave mirror is provided thereon with a filter film, and the filter film is semi-transmissive and semi-reflective film or a reflective film.

According to a second aspect of the present disclosure, an electronic device is provided. The electronic device comprises a display screen and the optical module as described in the first aspect. An image beam emitted by the display screen is the incident light, and the first light beam and the second light beam are combined and then enter human eyes.

The technical effects of the present disclosure are as follows.

The present disclosure provides an optical module comprising a beam splitting assembly, a first dimmer assembly, a second dimmer assembly and a beam combining assembly. The beam splitting assembly divides the incident light into a first light beam and a second light beam that propagate in different directions, and the first light beam and the second light beam can both enter the beam combining assembly after passing through the first dimmer assembly and the second dimmer assembly. Finally the beam combining assembly combines the first light beam and the second light beam, so that two fields of view of the first light beam and the second light beam are spliced to form a virtual image of double images on a single screen, thereby increasing the final angle of view of the entire optical module.

By the following detailed description of the exemplary embodiments of the present disclosure with reference to the accompanying drawings, other features and advantages of the present disclosure will become clear.

BRIEF DESCRIPTION OF DRAWINGS

The present invention will hereinafter be described in conjunction with the following drawing figures, wherein like numerals denote like elements, and.

Figure 1:
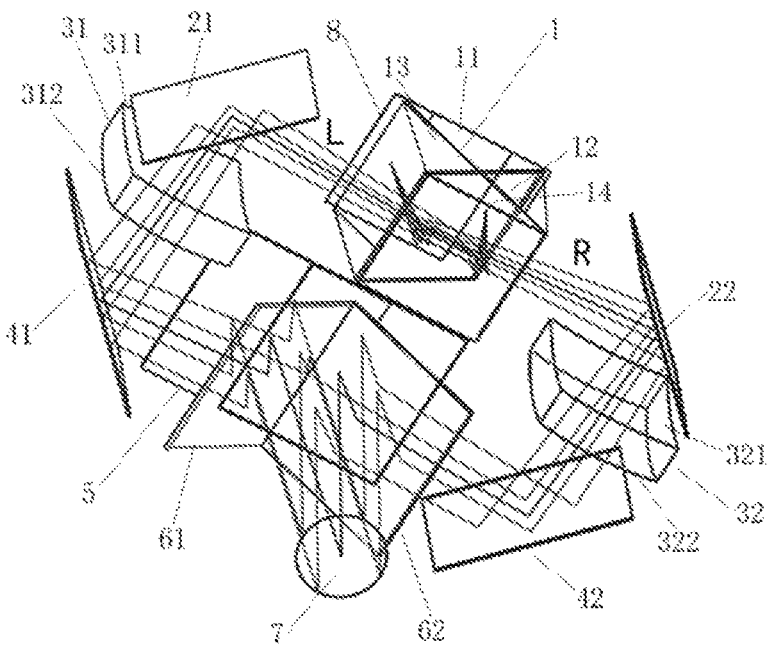
FIG. 1 is a schematic diagram of a light path of an optical module according to the present disclosure.

In the drawings: 1. beam splitting assembly; 11. first prism; 12. second prism; 13. third prism; 14. fourth prism; 111. light incidence surface; 121. second exit surface; 131. first exit surface; 141. reflecting surface; 21. first reflector; 22. third reflector; 31. first lens; 311. object side face of first lens; 312. image side face of first lens; 32. second lens; 321. object side surface of second lens; 322. image side face of second lens; 41. second reflector; 42. fourth reflector; 5. concave mirror; 61. first flat lens; 62. second flat lens; 7. human eye; 8. display screen; L. first light beam; R. second light beam.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

The technical solutions in embodiments of the present disclosure will be described clearly and completely below with reference to the drawings in the embodiments of the present disclosure. Obviously, the embodiments as described below are merely part of, rather than all, embodiments of the present disclosure. Based on the embodiments of the present disclosure, any other embodiment obtained by a person of ordinary skill in the art without paying any creative effort shall fall within the protection scope of the present disclosure.

The following description of at least one exemplary embodiment is in fact only illustrative, and in no way serves as any restriction on the present disclosure and its application or use.

The techniques, methods and equipment known to a person of ordinary skill in the art may not be discussed in detail, but in appropriate cases, these techniques, methods and equipment shall be considered as a part of the specification.

In all the examples shown and discussed herein, any specific value should be interpreted as merely illustrative and not as a limitation. Therefore, other examples of the exemplary embodiments may have different values.

It should be noted that similar reference numerals and letters denote similar items in the following drawings. Therefore, once an item is defined in one drawing, it does not need to be further discussed in the subsequent drawings.

As shown in FIGS. 1 to 4, the present disclosure provides an optical module comprising a beam splitting assembly 1, a first light dimmer assembly, a second light dimmer assembly and a beam combining assembly. The beam splitting assembly 1 is configured to divide the incident light into a first light beam L and a second light beam R that propagate in different directions. The first dimming assembly is located on the light path of the first light beam L, and the second dimming assembly is located on the light path of the second light beam R. The first dimming assembly and the second dimming assembly are configured to adjust the propagation directions of the first light beam L and the second light beam R respectively, so that the light paths of the first light beam L and the second light beam R have an intersection position. The beam combining assembly is located at the intersection position, so that the first light beam L and the second light beam R entering the beam combining assembly exit concurrently along the same direction.

Figure 2:
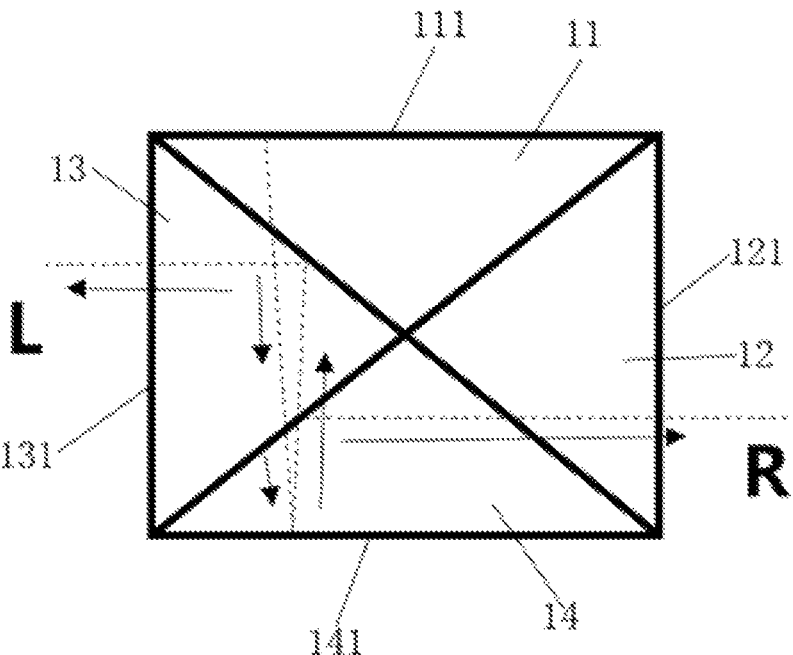
FIG. 2 is a schematic diagram of a light path of a beam splitting assembly according to the present disclosure.
Figure 3:
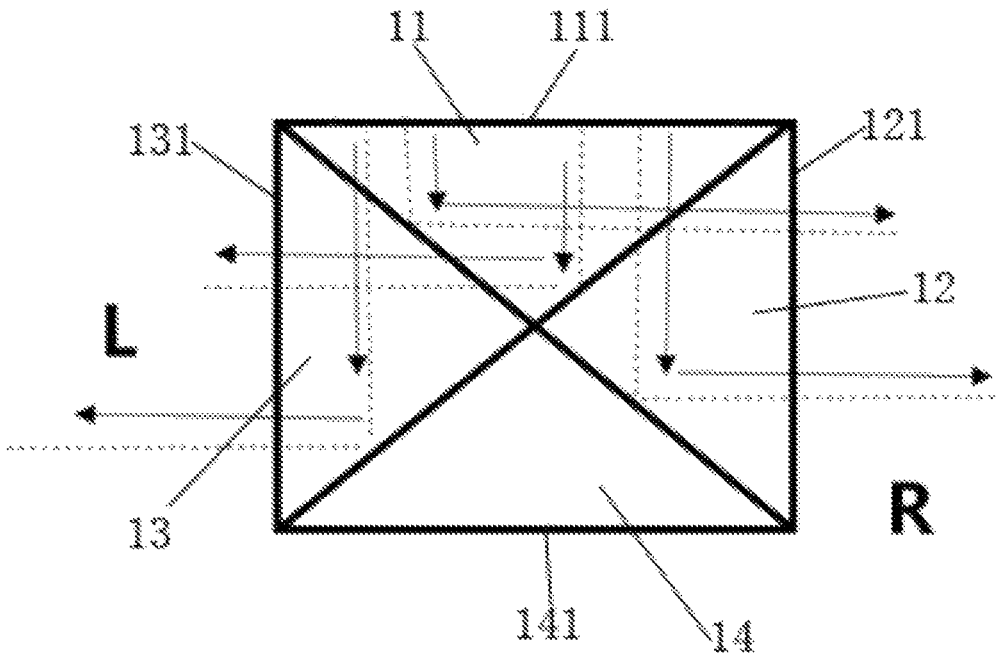
FIG. 3 is a schematic diagram of a light path of another beam splitting assembly according to the present disclosure.

Specifically, the optical module according to the present disclosure comprises a beam splitting assembly 1, a first dimming assembly, a second dimming assembly and a beam combining assembly. The beam splitting assembly 1 divides the incident light (such as the light beam with image information emitted from the display screen 8 or the display panel, etc.) into the first light beam L and the second light beam R (as shown in FIG. 2 or FIG. 3) that propagate in different directions. The direction of the first light beam L is adjusted by the first dimming assembly, the direction of the second light beam R is adjusted by the second dimming assembly, and finally the beams both enter the beam combining assembly (refer to FIG. 1). The beam combining assembly combines the entered first light beam L and second light beam R so that the first light beam L and the second light beam R are spliced and then concurrently exit along the same direction (refer to FIGS. 1 and 4). The first dimming assembly and the second dimming assembly can adjust the propagation directions of the first light beam L and the second light beam R according to the position of the beam combining assembly, so that the first light beam L and the second light beam R propagate along the direction toward the beam combining assembly. Alternatively, the first dimming assembly and the second dimming assembly may adjust the propagation directions of the first light beam L and the second light beam R to have an intersection position, and then the beam combining assembly is placed at the intersection position. As long as the first light beam L and the second light beam R can be enabled to enter the beam combining assembly, there is no limitation in the present disclosure.

In the above process, after the incident light is divided by the beam splitting assembly 1, the image information carried by the obtained first light beam L and second light beam R is the same. After they enter the beam combining assembly respectively, two fields of view formed by the first light beam L and the second light beam R are spliced to form a virtual image of double images on a single screen, thereby increasing the finally formed angle of view. After they enter the human eye 7, the size of the image perceived will also increase accordingly. In the prior art, the virtual image is formed by a single image on a single screen, and the maximum angle of view is about 30°; on the other hand, in this embodiment, the angle of view of the virtual image formed by double images on a single screen can be increased to 60° to 110°. In addition, the assemblies of the optical module in the present disclosure have simple structure and are applicable to small electronic devices such as AR, VR, eyepiece lens, etc.

Optionally, the beam splitting assembly 1 is a glued prism formed by gluing four isosceles triangular prisms. The glued prism has a light incidence surface 111 and two light exit surfaces, the incident light enters from the light incidence surface 111, and the first light beam L and the second light beam R exit from the two light exit surfaces respectively.

Specifically, in this embodiment, the beam splitting assembly 1 is formed by gluing four isosceles triangular prisms, and its structure and processing are relatively simple. As shown in FIGS. 2 and 3, the four isosceles triangular prisms include the first prism 11, the second prism 12, the third prism 13 and the fourth prism 14, respectively. The main cross section of the glued prism may be rectangular or square. The incident light may enter from the light incident surface 111 of the gluing prism. By providing a filter film on the gluing surfaces of the gluing prism, the incident light can be divided into the first light beam L and the second light beam R along different propagation directions.

As shown in FIG. 2, in an embodiment of the present disclosure, a semi-transmissive and semi-reflective film may be respectively provided on the gluing surfaces of the gluing prism, and a reflective film may be provided on the surface opposite to the light incidence surface 111 (i.e., the reflective surface 141). After the incident light enters the gluing prism from the light incidence surface 111, part of the incident light directly passes through the gluing surface of the first prism 11 and the third prism 13 as well as the gluing surface of the third prism 13 and the fourth prism 14, and reaches the reflective surface 141. This part of the incident light is reflected back to the gluing surface of the third prism 13 and the fourth prism 14 due to the effect of the reflective film on the reflective surface 141, and then is reflected and transmitted by the semi-transmissive and semi-reflective film on the gluing surface of the third prism 13 and the fourth prism 14. After being reflected, part of the incident light exits from the second exit surface 121 on the right due to the transmission effect of the semi-transmissive and semi-reflective film on the gluing surface of the second prism 12 and the fourth prism 14; the other part of the incident light passes through the gluing surface of the third prism 13 and the fourth prism 14, reaches the gluing surface of the first prism 11 and the third prism 13 again, and exits from the first exit surface 131 due to the reflection effect of the semi-transmissive and semi-reflective film on the gluing surface of the first prism 11 and the third prism 13. Similarly, the incident light reaching the gluing surface of the first prism 11 and the second prism 12 exits from the left and right sides of the gluing prism along similar light paths, which will not be repeated here. The light beam exiting from the left side is the first light beam L, and the light beam exiting from the right side is the second light beam R.

As shown in FIG. 3, in another embodiment of the present disclosure, the gluing surfaces of the gluing prism may be respectively provided with a semi-transmissive and semi-reflective film, while the surface opposite to the light incident surface 111 may not be provided with a filter film, thereby simplifying the manufacturing process of the gluing prism. In this embodiment, the beam splitting principle of the incident light is as follows. After entering the gluing prism, the incident light reaches the gluing surface of the first prism 11 and the third prism 13 as well as the gluing surface of the first prism 11 and the second prism 12. Due to the reflection and transmission effects of the semi-transmissive and semi-reflective film on the gluing surface, part of the incident light is reflected, and exits directly from the first exit surface 131 and the second exit surface 121 on the left and right sides. The other part of the incident light passes through the gluing surface and reaches the gluing surface of the third prism 13 and the fourth prism 14 as well as the gluing surface of the second prism 12 and the fourth prism 14, respectively. Due to the reflection effect of the semi-transmissive and semi-reflective films on the gluing surfaces, it also exits from the first exit surface 131 and the second exit surface 121 on the left and right sides, respectively. Through the above process, the light beam exiting from the first exit surface 131 forms the first light beam L, and the light beam exiting from the second exit surface 121 forms the second light beam R.

The beam splitting assembly 1 according to the present disclosure is not limited to being formed by gluing four isosceles triangular prisms, and may have other structural forms.

Optionally, the optical path length of the first light beam L from the light incidence surface 111 to the corresponding light exit surface is equal to the optical path length of the second light beam R from the light incidence surface 111 to the corresponding light exit surface.

Specifically, in this embodiment, the equal optical path lengths of the first light beam L and the second light beam R from the light incidence surface 111 to the light exit surfaces may be realized by gluing four identical isosceles triangular prisms together to form a glued prism having a square main cross section, or by setting a compensation prism on the light exit surface of the beam whose optical path length is shorter, which is not limited in the present disclosure. By making the optical path lengths of the first light beam L and the second light beam R equal, the first light beam L and the second light beam R can exit from the beam splitting assembly 1 at the same time, so that the first light beam L and the second light beam R can concurrently and separately enter the first and second light beam dimmers, and in subsequent beam combining, the structure of the beam combining assembly can be simplified, so that the first light beam L and the second light beam R can concurrently exit from the beam combining assembly along the same direction.

Optionally, each isosceles triangular prisms is made of a glass material having a refractive index of 1.5 to 1.55.

Specifically, the refractive index will affect the optical path length of the beam to a certain extent. The optical path length of the glued prism made of materials having a higher refractive index will be shorter, which will make the volume and weight of the entire beam combining assembly smaller. However, materials having a high refractive index are expensive and cannot be widely used in electronic products. In this embodiment, it is made of a glass material having a refractive index of 1.5 to 1.55, such as K9 material, which has a refractive index of 1.51630 and is cheap, and can balance the volume and weight requirements of the beam combining assembly. In addition, the glass material has a low temperature drift, which can improve the optical performance of the optical module.

Optionally, as shown in FIG. 1, the first light beam L and the second light beam R obtained by dividing the incident light have opposite propagation directions. The first dimming assembly comprises a first lens 31, a first reflector 21 and a second reflector 41. The first light beam L changes its propagation direction by 180° after reflected by the first reflector 21, transmitted by the first lens 31 and reflected by the second reflector 41 successively, and then enters the beam combining assembly. The second dimming assembly comprises a second lens 32, a third reflector 22 and a fourth reflector 42. The second light beam R changes its propagation direction by 180° after reflected by the third reflector 22, transmitted by the second lens 32 and reflected by the fourth reflector 42, and then enters the beam combining assembly concurrently with the first light beam L. The first lens 31 and the second lens 32 have positive focal powers.

Specifically, in this embodiment, the first dimming assembly comprises a first reflector 21 and a second reflector 41. After the first light beam L exits from the beam combining assembly, it enters the first reflector 21 and is reflected by the first reflector 21, and then enters the second reflector 41 and is reflected again by the second reflector 41, so that its propagation direction changes by 180° compared with its direction when it exits from the beam splitting assembly 1 (refer to the first light exit surface 131 in FIG. 2).

Similarly, the propagation direction of the second light beam R will also change by 180° compared with the direction when it exits from the beam splitting assembly 1 (refer to the second light exit surface 121 in FIG. 2). Since the propagation directions of the first light beam L and the second light beam R when they exit from the beam splitting assembly 1 are opposite, there will be an intersection position when the directions of the first light beam L and the second light beam R are changed by 180°. When the beam combining assembly is located at this position, the first light beam L and the second light beam R can enter respectively the beam combining assembly. In this embodiment, the first reflector 21, the second reflector 41, the third reflector 22, and the fourth reflector 42 may be a flat mirror or a spherical mirror, which can be selected according to the requirements of reflection, and is not limited in the present disclosure.

Optionally, it further comprises a shaping lens group, which is located on the light path of the first light beam L and/or the second light beam R for transmitting the first light beam L and/or the second light beam R.

Specifically, in this embodiment, the shaping lens group can provide the main focal power for system imaging and is used to improve system aberration and image quality. It comprises at least one lens, and the lens type may be one or more of spherical lens, aspherical lens, Fresnel lens, diffractive lens, etc., which is not limited in the present disclosure. For example, when the shaping lens group comprises one lens, it may be located on the light path of the first light beam L or on the light path of the second light beam R to improve the imaging quality of the first light beam L or the second light beam R. When the shaping lens group comprises two or more lenses, the lenses may be evenly arranged on the light paths of the first light beam L and the second light beam R to improve the imaging effect of the system.

As shown in FIG. 1, in an embodiment, the shaping lens group comprises a first lens 31 and a second lens 32, the first lens 31 is located on the light path of the first light beam L, and the second lens 32 is located on the light path of the second light beam R. Preferably, the first lens 31 and the second lens 32 both have positive focal powers.

Specifically, in this embodiment, the first lens 31 is located on the light path of the first light beam L, namely, the first lens 31 may be located between the first reflector 21 and the second reflector 41, or between the beam splitting assembly and the first reflector 21, or between the second reflector 41 and the light beam combining assembly. As long as the first lens 31 can receive and transmit the first light beam L, it is not limited in the present disclosure. The transmission of the first light beam L through the first lens 31 having a positive focal power can eliminate the aberration and make the final imaging effect of the first light beam L better. The position setting of the second lens 32 in the light path of the second light beam may refer to the setting of the first lens 31, and the second lens 32 can also be used to eliminate the aberration. In addition, the first lens 31 and the second lens 32 may be convex lenses or concave lenses, which is not limited in the present disclosure.

Optionally, on the basis of the above embodiment, the thickness of the first lens 31 is 1.5 to 3 mm, the radius of curvature of the object side surface 311 of the first lens is 25 to 30 mm, and the radius of curvature of the image side surface 312 of the first lens is 17 to 20 mm; the distance between the first reflector 21 and the object side surface 311 of the first lens 21 is 3 to 5 mm, and the distance between the second reflector 41 and the image side surface 312 of the first lens is 4 to 6 mm. The parameter setting of the second lens 32 is the same as that of the first lens 31.

Specifically, in this embodiment, the first lens 31 is disposed between the first reflector 21 and the second reflector 41; the object side surface 311 of the first lens is the surface that is close to the beam splitting assembly 1 (i.e., the incident surface of the first light beam L on the first lens 31); the image side surface 312 of the first lens is the surface that is far from the beam splitting assembly 1 and close to the beam combining assembly (i.e., the exit surface of the first light beam L on the first lens 31). The thickness of the first lens 31 is the distance between the centers of the object side surface 311 and the image side surface of the first lens 31. In this embodiment, the thickness of the first lens 31 is set to 1.5 to 3 mm, the radius of curvature of the object side surface 311 of the first lens is set to 25 to 30 mm, and the radius of curvature of the image side surface 312 of the first lens is set to 17 to 20 mm, which can well balance the overall volume of the first lens 31 and the effect of amplifying the first light beam L. If the thickness is too large, the system weight of the first dimming assembly will increase, and it will be difficult to ensure the amplified beam effect. If the thickness is too small, its effect of amplifying the first light beam L will be insufficient.

In addition, when the parameters of the first lens 31 are defined, the distances from the first reflector 21 and the second reflector 41 to the first lens 31 are defined, which also ensures the effect of amplifying the first light beam L of the first lens 31 to a certain extent. Since the first lens 31 can amplify the first light beam L to a certain extent, the distance from the second reflector 41 to the first lens 31 needs to be greater than the distance from the first reflector 21 to the first lens 31 to ensure the complete reception of the first light beam L by the second reflector 41.

The parameters of the second lens 32 are the same as those of the first lens 31. Namely, the second lens 32 is disposed between the third reflector 22 and the fourth reflector 42, the thickness of the second lens 32 is 1.5 to 3 mm, the radius of curvature of the object side surface 321 of the second lens (i.e., the incident surface of the second light beam R on the second lens 32) is 25 to 30 mm, and the radius of curvature of the image side surface 322 of the second lens (i.e., the exit surface of the second light beam R on the second lens 32) is 17 to 20 mm; the distance between the third reflector 22 and the side surface 321 of the second lens is 3 to 5 mm, and the distance between the fourth reflector 42 and the side surface 322 of the second lens is 4 to 6 mm. If the parameters of the second lens 32 are the same as those of the first lens 31, the processing can be simplified, and the parameter adjustment error of the system can be reduced. The setting of the second lens 32 will not be repeated in this embodiment.

Preferably, in this embodiment, the thickness of the first lens 31 is 1.5 mm, 2 mm or 3 mm; correspondingly, the radius of curvature of the object side surface 311 of the first lens is 25 mm, 27 mm or 30 mm; correspondingly, the radius of curvature of the image side surface is 17 mm, 18 mm or 20 mm. The distance between the first reflector 21 and the object side surface 311 of the first lens is 3 mm, 4 mm or 4 mm; correspondingly, the distance between the second reflector 41 and the image side surface 312 of the first lens is 4 mm, 5 mm or 6 mm. Similarly, the parameters of the second lens 32 are the same as those of the first lens 31.

Optionally, the first lens 31 and the second lens 32 are made of plastic materials having a refractive index of 1.5 to 1.6.

Specifically, the refractive index will affect the optical path length of the beam to a certain extent. The optical path length of the glued prism made of materials having a higher refractive index will be shorter, which will make the volume and weight of the entire beam combining assembly smaller. However, materials having a high refractive index are expensive and cannot be widely used in electronic products. In this embodiment, it is made of a plastic material having a refractive index of 1.5 to 1.55, such as PC material, which has a refractive index of 1.586 and is cheap, and can balance the volume and weight requirements of the beam combining assembly. In addition, the plastic material is light, and thus can reduce the weight of the system.

Figure 4:
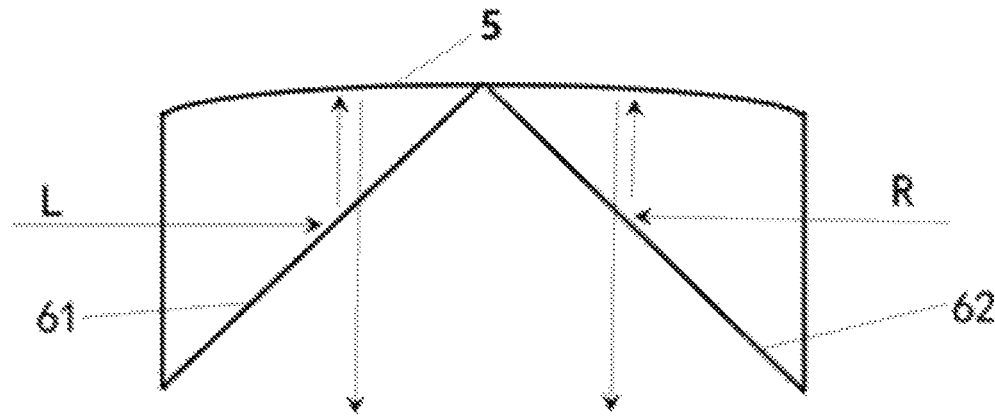
FIG. 4 is a schematic diagram of a light path of a beam combining assembly according to the present disclosure.

Optionally, as shown in FIG. 4, the beam combining assembly comprises a first flat lens 61, a second flat lens 62, and a concave mirror 5. The first light beam L is reflected by the first flat lens 61, and then is reflected by the concave mirror 5, and then passes through the first flat lens 61, and finally exits from the beam combining assembly. The second light beam R is reflected by the second flat lens 62, and then is reflected by the concave mirror 5, and then passes through the first flat lens 61, and finally exits from the beam combining assembly along a same direction as the first light beam L.

Specifically, in this embodiment, the beam combining assembly comprises a first flat lens 61, a second flat lens 62, and a concave mirror 5. The first flat lens 61 is configured to receive the first light beam L exiting from the first dimming assembly, and the second flat lens 62 is configured to receive the second light beam R exiting from the second dimming assembly. Preferably, when the first light beam L enters the first flat lens 61, its incidence angle may be set to be greater than a certain critical angle (this critical angle is determined according to the refractive index of the material of the first flat lens 61), so that the first light beam L is fully reflected on the first flat lens 61, and then reaches the concave mirror 5, and then is reflected by the concave mirror 5, and then passes through the first flat lens 61 and exits. The second light beam R is fully reflected by the second flat lens 62, and then is also reflected by the concave mirror 5, and then passes through the second flat lens 62 and exits. The concave mirror 5 is a spherical mirror which uses a concave surface as the reflecting surface 141.

In this embodiment, if the first light beam L and the second light beam R concurrently reach the first flat lens 61 and the second flat lens 62 from opposite directions respectively, the first flat lens 61 and the second flat lens 62 can be symmetrically arranged relative to the concave mirror 5, and the structure and material of the first flat lens 61 and the second flat lens 62 can be the same. If the first light beam L and the second light beam R do not reach the first flat lens 61 and the second flat lens 62 concurrently, the positions of the first flat lens 61 and the second flat lens 62 can be adjusted according to the light incidence direction and other conditions. It is not limited in the present disclosure. In addition, in this embodiment, the concave mirror 5 can provide the function of reflection, and can also improve the illuminance of the first light beam L and the second light beam R after reaching the concave mirror 5. The concave mirror 5 may be replaced by other structures having the function of reflection, which is not limited in the present disclosure.

Optionally, the radius of curvature of the concave mirror 5 is 100 to 120 mm, and the distances from the concave mirror 5 to the first flat lens 61 and the second flat lens 62 are both 5 to 9 mm.

Specifically, in the present disclosure, the radius of curvature of the concave mirror 5 is 100 to 120 mm, and the distances from the concave mirror 5 to the first flat lens 61 and the second flat lens 62 are both 5 to 9 mm. It can be seen that the concave mirror 5 according to the present disclosure is a concave mirror 5 close to a flat mirror, so that the size of the beam combining assembly will not be greatly affected, and sufficient illuminance for the incoming beam can be ensured. Preferably, in the present disclosure, the radius of concave mirror 5 is 115 mm, and the distances from the concave mirror 5 to the first flat lens 61 and the second flat lens 62 are both 6 mm.

Optionally, the concave mirror 5 is provided thereon with a light filtering film, and the light filtering film is a semi-transmissive and semi-reflective film or a reflective film.

Specifically, in this embodiment, the filter film provided on the concave mirror 5 can be selected according to the actual function of the device to which it is applied. For example, in AR equipment, ambient light must enter, and the first light beam L and the second light beam R after combined by the light combining assembly will usually directly enter the human eye 7. Therefore, if a semi-transmissive and semi-reflective film is provided on the concave mirror 5, the ambient light from the outside can pass through the concave mirror 5 and enter the human eye 7, thereby increasing the applicable range of the entire optical module. For example, in AR equipment, if a reflective film is provided on the concave mirror 5, the reflectivity of concave mirror 5 can be improved, and the light beam finally entering the human eye will be clearer and more complete.

Optionally, the distances from the beam splitting assembly 1 to the first dimming assembly and the second dimming assembly are both 8 to 11 mm, and the distances from the first dimming assembly and the second dimming assembly to the beam combining assembly are both 6 to 9 mm.

Specifically, if the distances from the beam splitting assembly 1 and the beam combining assembly to the first dimming assembly and the second dimming assembly are too large, the size of the entire optical module will be affected; if the distances are too small, its effect of adjusting the first light beam L or the second light beam R is insufficient. In this embodiment, the distances from the beam splitting assembly 1 to the first dimming assembly and the second dimming assembly are both set to 8 to 11 mm, and the distances from the first dimming assembly and the second dimming assembly to the beam combining assembly are both set to 6 to 9 mm, which can effectively balance the system weight and optical efficiency of the optical module. Preferably, the distances from the beam splitting assembly 1 to the first dimming assembly and the second dimming assembly are both 10 mm, and the distances from the first dimming assembly and the second dimming assembly to the beam combining assembly are both 7 mm.

The present disclosure also provides an electronic device. The electronic device comprises a display screen 8 and the optical module described in any of the above embodiments or the combinations thereof. The image beam emitted by the display screen 8 is the incident light, and the first light beam L and the second light beam R are combined and then enter the human eye 7.

Specifically, if the optical module in the present disclosure is used in electronic devices, by splitting and combining the incident light, the two fields of view are spliced to form a virtual image of double images on a single screen, which makes the angle of view of electronic devices larger and the user experience better. The electronic devices in the present disclosure may be AR, VR, eyepiece lens and other products that can use the optical module, which is not limited in the present disclosure.

What is highlighted in the above examples is the difference between the various embodiments. As long as the different optimization features between the various embodiments are not contradictory, they can be combined to form a better embodiment. Considering the simplicity of the text, it will not be repeated here.

Although some specific embodiments of the present disclosure have been described in detail by examples, those skilled in the art should understand that the above examples are only for illustration, not for limiting the scope of the present disclosure. Those skilled in the art should understand that the above embodiments can be modified without departing from the scope and spirit of the present disclosure. The scope of the present disclosure is defined by the appended claims.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. An optical module, comprising:
a beam splitting assembly configured to divide an incident light into a first light beam and a second light beam that propagate in different directions;
a first dimming assembly and a second dimming assembly, wherein the first dimming assembly is located on a light path of the first light beam, the second dimming assembly is located on a light path of the second light beam, the first dimming assembly and the second dimming assembly adjust propagation directions of the first light beam and the second light beam respectively so that the light path of the first light beam and the light path of the second light beam have an intersection position; and
a beam combining assembly located at the intersection position so that the first light beam and the second light beam entering the beam combining assembly exit concurrently along a same direction wherein the beam splitting assembly is a glued prism formed by gluing four isosceles triangular prisms, the glued prism has a light incidence surface and two light exit surfaces, the incident light enters from the light incidence surface, and the first light beam and the second light beam exit from the two light exit surfaces respectively.

2. The optical module according to claim 1, wherein an optical path length of the first light beam from the light incidence surface to the corresponding light exit surface is equal to an optical path length of the second light beam from the light incidence surface to the corresponding light exit surface.

3. An electronic device, comprises a display screen and the optical module according to claim 2, wherein an image beam emitted by the display screen is the incident light, and the first light beam and the second light beam are combined and then enter human eyes.

4. The optical module according to claim 1, wherein each isosceles triangular prisms is made of a glass material having a refractive index of 1.5 to 1.55.

5. An electronic device, comprises a display screen and the optical module according to claim 4, wherein an image beam emitted by the display screen is the incident light, and the first light beam and the second light beam are combined and then enter human eyes.

6. The optical module according to claim 1, wherein
the first light beam and the second light beam obtained by dividing the incident light have opposite propagation directions;
the first dimming assembly comprises a first reflector and a second reflector, the first light beam changes its propagation direction by 180° after reflected by the first reflector and the second reflector successively, and then enters the beam combining assembly;
the second dimming assembly comprises a third reflector and a fourth reflector, the second light beam changes its propagation direction by 180° after reflected by the third reflector and the fourth reflector successively, and then enters the beam combining assembly concurrently with the first light beam.

7. An electronic device, comprises a display screen and the optical module according to claim 6, wherein an image beam emitted by the display screen is the incident light, and the first light beam and the second light beam are combined and then enter human eyes.

8. The optical module according to claim 1, further comprising a shaping lens group located on the light path of the first light beam and/or the second light beam for transmitting the first light beam and/or the second light beam.

9. The optical module according to claim 8, wherein the shaping lens group is made of a plastic material having a refractive index of 1.5 to 1.6.

10. An electronic device, comprises a display screen and the optical module according to claim 9, wherein an image beam emitted by the display screen is the incident light, and the first light beam and the second light beam are combined and then enter human eyes.

11. An electronic device, comprises a display screen and the optical module according to claim 8, wherein an image beam emitted by the display screen is the incident light, and the first light beam and the second light beam are combined and then enter human eyes.

12. The optical module according to claim 1, wherein the beam combining assembly comprises a first flat lens, a second flat lens and a concave mirror;

the first light beam is reflected by the first flat lens, and then is reflected by the concave mirror, and then passes through the first flat lens, and finally exits from the beam combining assembly;

the second light beam is reflected by the second flat lens, and then is reflected by the concave mirror, and then passes through the first flat lens, and finally exits from the beam combining assembly along a same direction as the first light beam.

13. The optical module according to claim 12, wherein the concave mirror is provided thereon with a filter film, and the filter film is semi-transmissive and semi-reflective film or a reflective film.

14. An electronic device, comprises a display screen and the optical module according to claim 13, wherein an image beam emitted by the display screen is the incident light, and the first light beam and the second light beam are combined and then enter human eyes.

15. An electronic device, comprises a display screen and the optical module according to claim 12, wherein an image beam emitted by the display screen is the incident light, and the first light beam and the second light beam are combined and then enter human eyes.

16. An electronic device, comprises a display screen and the optical module according to claim 1, wherein an image beam emitted by the display screen is the incident light, and the first light beam and the second light beam are combined and then enter human eyes.

\* \* \* \* \*